US008376271B2

(12) United States Patent
Saito et al.

(10) Patent No.: US 8,376,271 B2
(45) Date of Patent: Feb. 19, 2013

(54) AIRCRAFT ACTUATOR

(75) Inventors: Makoto Saito, Hyogo (JP); Chris Worrall, Lancashire (GB)

(73) Assignee: Nabtesco Corporation (JP)

( * ) Notice: Subject to any disclaimer, the term of this patent is extended or adjusted under 35 U.S.C. 154(b) by 223 days.

(21) Appl. No.: 12/763,684

(22) Filed: Apr. 20, 2010

(65) Prior Publication Data

US 2010/0270426 A1 Oct. 28, 2010

(30) Foreign Application Priority Data

Apr. 27, 2009 (JP) ................................. 2009-107755

(51) Int. Cl.
*B64C 13/40* (2006.01)
(52) U.S. Cl. ...................................... 244/99.3; 244/213
(58) Field of Classification Search ................. 244/78.1, 244/99.2, 99.3, 99.7, 213, 214, 215, 216, 244/217
See application file for complete search history.

(56) References Cited

U.S. PATENT DOCUMENTS

| 2,387,492 | A | * | 10/1945 | Blaylock et al. | 244/217 |
|---|---|---|---|---|---|
| 3,556,439 | A | * | 1/1971 | Autry et al. | 244/210 |
| 4,445,655 | A | * | 5/1984 | Hueberger | 244/214 |
| 4,479,620 | A | * | 10/1984 | Rogers et al. | 244/195 |
| 5,098,043 | A | * | 3/1992 | Arena | 244/215 |
| 5,651,513 | A | * | 7/1997 | Arena | 244/99.3 |
| 5,836,550 | A | * | 11/1998 | Paez | 244/214 |
| 5,839,694 | A | * | 11/1998 | Bargull et al. | 244/118.1 |
| 6,270,039 | B1 | * | 8/2001 | Linjama | 244/213 |
| 6,481,667 | B1 | * | 11/2002 | Ho | 244/99.11 |
| 6,802,475 | B2 | * | 10/2004 | Davies et al. | 244/99.2 |
| 7,011,276 | B2 | * | 3/2006 | Stephan | 244/216 |
| 7,500,641 | B2 | * | 3/2009 | Sakurai et al. | 244/215 |
| 2003/0080246 | A1 | * | 5/2003 | Koizumi et al. | 244/75 R |
| 2008/0169383 | A1 | * | 7/2008 | Patzelt et al. | 244/216 |
| 2010/0320332 | A1 | * | 12/2010 | Voss et al. | 244/217 |
| 2011/0031347 | A1 | * | 2/2011 | Allen | 244/99.3 |
| 2011/0139938 | A1 | * | 6/2011 | Itoh et al. | 244/226 |
| 2011/0220761 | A1 | * | 9/2011 | Ogawa et al. | 244/99.3 |
| 2011/0290946 | A1 | * | 12/2011 | Peirce | 244/213 |

FOREIGN PATENT DOCUMENTS

| JP | 62-165007 | 7/1987 |
|---|---|---|
| JP | 05-097095 | 4/1993 |

* cited by examiner

*Primary Examiner* — Benjamin P Lee
(74) *Attorney, Agent, or Firm* — Studebaker & Brackett PC; Donald R. Studebaker

(57) ABSTRACT

An aircraft actuator is provided that can achieve a significant weight reduction, while securing a sufficient tensile strength and a sufficient buckling strength, even if it is provided with a reaction link in which large bent portions are formed. A reaction link is made of fiber reinforced plastic, and includes a pair of linear portions, a coupling portion, and a pair of bent portions. The cross section at the pair of linear portions, the coupling portion, and the pair of bent portions is formed as a hollow cross section. The outer cross sectional area of the hollow cross section at each of the pair of bent portions is configured to be larger than the outer cross sectional area of the hollow cross section at each of the pair of linear portions.

5 Claims, 15 Drawing Sheets

AIRCRAFT ACTUATOR

CROSS-REFERENCE TO RELATED APPLICATIONS

This application claims priority to Japanese Patent Application No. 2009-107755. The entire disclosure of Japanese Patent Application No. 2009-07755 is hereby incorporated herein by reference.

BACKGROUND OF THE INVENTION

1. Field of the Invention

The present invention relates to an aircraft actuator including a hydraulically driven cylinder that is attached to a control surface or a horn arm member, and a reaction link that is provided pivotally with respect to the cylinder and the control surface.

2. Description of Related Art

An aircraft is provided with control surfaces that are formed as moving surfaces (flight control surfaces) and are configured as an aileron, a rudder, an elevator, and the like. As aircraft actuators for driving such control surfaces, aircraft actuators as disclosed in JP H5-097095A and JP S62-165007A are known that include a hydraulically driven cylinder that is attached to a control surface or a horn arm member attached to the control surface, and a reaction link that is provided pivotally with respect to the cylinder and the control surface.

As described above, the aircraft actuators disclosed in JP H5-097095A and JP S62-165007A include a reaction link. From the viewpoint of achieving weight reduction while securing a specific strength, such a reaction link is made of light metal such as titanium alloy or aluminum alloy. Also, the reaction link that is provided pivotally with respect to the cylinder and the control surface is formed in the shape of a portal including a pair of linear portions, a coupling portion, and a pair of bent portions, in order to stably drive the control surface via actuation of the cylinder. The pair of linear portions are disposed alongside each other and each extend linearly, and the coupling portion is provided so as to couple one end of each of the pair of linear portions on the same side to each other. The pair of bent portions are formed as connection portions between the coupling portion and the pair of linear portions. Also, the other end of each of the pair of linear portions is provided pivotally with respect to the other end of the cylinder, and the center portion of the coupling portion is provided pivotally with respect to the control surface. Note that each of the pair of linear portions is usually formed as a member that has a flange portion formed at each end in the width direction and thus has a cross section of an I-shape or H-shape, from the viewpoint of weight reduction.

However, even for a metal reaction link made of titanium alloy or the like in order to achieve weight reduction while securing a specific strength, there is a limit to weight reduction, and it is difficult to achieve a further weight reduction in the current situation. Furthermore, due to the influence of lift exerted on the control surface, a large tensile load and a large compressive load are exerted on the reaction link that is provided pivotally with respect to the cylinder and the control surface for driving the control surface. Since the reaction link is provided with a pair of large bent portions that are bent at substantially a right angle relative to a pair of linear portions, as described above, it is important to suppress buckling deformation due to a compressive load and secure the buckling strength required for that purpose, in addition to suppressing the above-described deformation due to a tensile load and securing the tensile strength required for that purpose, in order to achieve a further weight reduction.

SUMMARY OF THE INVENTION

In view of the above-described situations, it is an object of the present invention to provide an aircraft actuator that can achieve a significant weight reduction, while securing a sufficient tensile strength and a sufficient buckling strength, even if it is provided with a reaction link in which large bent portions are formed.

In order to achieve the above-described object, an aircraft actuator according to a first feature of the present invention includes: a cylinder that is driven by hydraulic pressure, and is attached, at one end thereof, pivotally with respect to a control surface of an aircraft or a horn arm member attached to the control surface; a reaction link that includes a pair of linear portions disposed alongside each other and each extending linearly, a coupling portion extending so as to couple one end of each of the pair of linear portions on the same side to each other, and a pair of bent portions formed as connection portions between the coupling portion and the pair of linear portions, the other end of each of the pair of linear portions being provided pivotally with respect to the other end of the cylinder, and a center portion of the coupling portion being provided pivotally with respect to the control surface, wherein the reaction link is made of fiber reinforced plastic, and is provided as a hollow member whose cross section at the pair of linear portions, the coupling portion, and the pair of bent portions is formed as a hollow cross section, and an outer cross-sectional area of the hollow cross section at each of the pair of bent portions is larger than an outer cross-sectional area of the hollow cross section at each of the pair of linear portions.

With this configuration, the reaction link including the pair of linear portions, the coupling portion, and the pair of bent portions is made of fiber reinforced plastic as a hollow member formed such that the cross section at each of the above-described portions is a hollow cross section. This enables a significant weight reduction as compared to an aircraft actuator that uses a conventional reaction link made of a metal such as titanium alloy. For fiber reinforced plastic, a sufficient tensile strength can be readily secured, but the compressive strength and buckling strength are lower relative to the tensile strength. Therefore, it is particularly important to suppress buckling deformation and secure a buckling strength at the pair of bent portions. In this respect, according to this configuration, the reaction link is formed such that the outer cross-sectional area (the cross-sectional area including the hollow portion in the inner region surrounded by the outer perimeter of the hollow cross section) of the hollow cross section at the pair of bent portions is larger than that at the pair of linear portions. This makes it possible to dispose a larger amount of the fiber reinforced plastic serving as the constituent material at the bent portions, where a higher buckling strength is required, and decrease the amount of the constituent material at the linear portions, where only a low buckling strength is required, within the range that can secure the required strength. Accordingly, it is possible to achieve an efficient arrangement of the constituent material for securing a buckling strength in addition to a tensile strength, thus achieving a further weight reduction while securing a sufficient buckling strength.

Thus, with this configuration, it is possible to provide an aircraft actuator that can achieve a significant weight reduction, while securing a sufficient tensile strength and a sufficient buckling strength, even if it is provided with a reaction link in which large bent portions are formed.

According to a second feature of the present invention, in the aircraft actuator having the first feature, the hollow cross section at each of the pair of bent portions is a cross section whose outer perimeter and inner perimeter are formed in an elliptical shape.

With this configuration, the bent portions are formed so as to have a hollow cross section whose outer perimeter and inner perimeter are formed in an elliptical shape. By forming the bent portions so as to have a hollow cross section of an elliptical shape, the occurrence of concentration of stress can be more suppressed than in the case of forming the bent portions so as to have a cross section of a rectangular shape. Also, by disposing the major axis of the cross section of an elliptical shape along the direction in which a large buckling strength is required, the bent portions can be formed so as to have a large thickness in the direction in which the buckling strength is required. Accordingly, it is possible to achieve a further efficient arrangement of the constituent material for securing a buckling strength at the bent portions, thus securing a sufficient buckling strength and achieving a further weight reduction.

According to a third feature of the present invention, in the aircraft actuator having the second feature, the pair of bent portions are formed such that major axes of the elliptical shape of the hollow cross section at the pair of bent portions are disposed along the same plane.

With this configuration, the pair of bent portions are formed such that the directions of the major axes of the cross section of an elliptical shape at the pair of bent portions are disposed along the same plane. Accordingly, at the pair of bent portions, the directions of the major axes of the cross section of an elliptical shape are aligned with each other along the direction in which a large buckling strength is required. This makes it possible to increase the thickness of the two bent portions in the direction in which a buckling strength is required, and decrease the thickness thereof in the minor axis direction, which is orthogonal to the aforementioned direction. Accordingly, it is possible to achieve a further efficient arrangement of the constituent material for securing a buckling strength at the two bent portions, thus securing a sufficient buckling strength and achieving a further weight reduction.

According to a fourth feature of the present invention, in the aircraft actuator having the second feature, the reaction link is made of carbon fiber reinforced plastic, and carbon fiber wound along a circumferential direction of the elliptical shape of the hollow cross section is provided at the pair of bent portions.

With this configuration, carbon fiber is wound in the circumferential direction at the bent portions of the reaction link that is made of carbon fiber reinforced plastic having a high strength and for which a significant weight reduction has been achieved. Accordingly, at the bent portions, where a larger buckling strength is required, it is possible to effectively suppress the occurrence of delamination of the carbon fiber in a direction orthogonal to the lengthwise direction of the reaction link.

According to a fifth feature of the present invention, in the aircraft actuator having the first feature, the pair of linear portions are formed such that an outer cross-sectional area of the hollow cross section at each of the pair of linear portions gradually decreases toward the other end.

With this configuration, the outer cross-sectional area of the hollow cross at the pair of linear portions is configured so as to gradually decrease. This makes it possible to dispose a larger amount of the fiber reinforced plastic serving as the constituent material at the end of each of the pair of linear portions that is closer to the bent portions, where a higher buckling strength is required, and gradually decrease the amount of the constituent material toward the other end, where only a low buckling strength is required, within the range that can secure the required strength, in an efficient manner. Accordingly, it is possible to achieve a further efficient arrangement of the constituent material, thus achieving a further weight reduction.

It should be appreciated that the above and other objects, and features and advantages of the present invention will become apparent from the following description taken in conjunction with the accompanying drawings.

DETAILED DESCRIPTION OF THE INVENTION

Hereinafter, an embodiment of the present invention will be described with reference to the accompanying drawings.

The embodiment of the present invention can be widely applied as an aircraft actuator including a hydraulically driven cylinder that is attached to a control surface or a horn arm member, and a reaction link that is provided pivotally with respect to the cylinder and the control surface.

Figure 1:
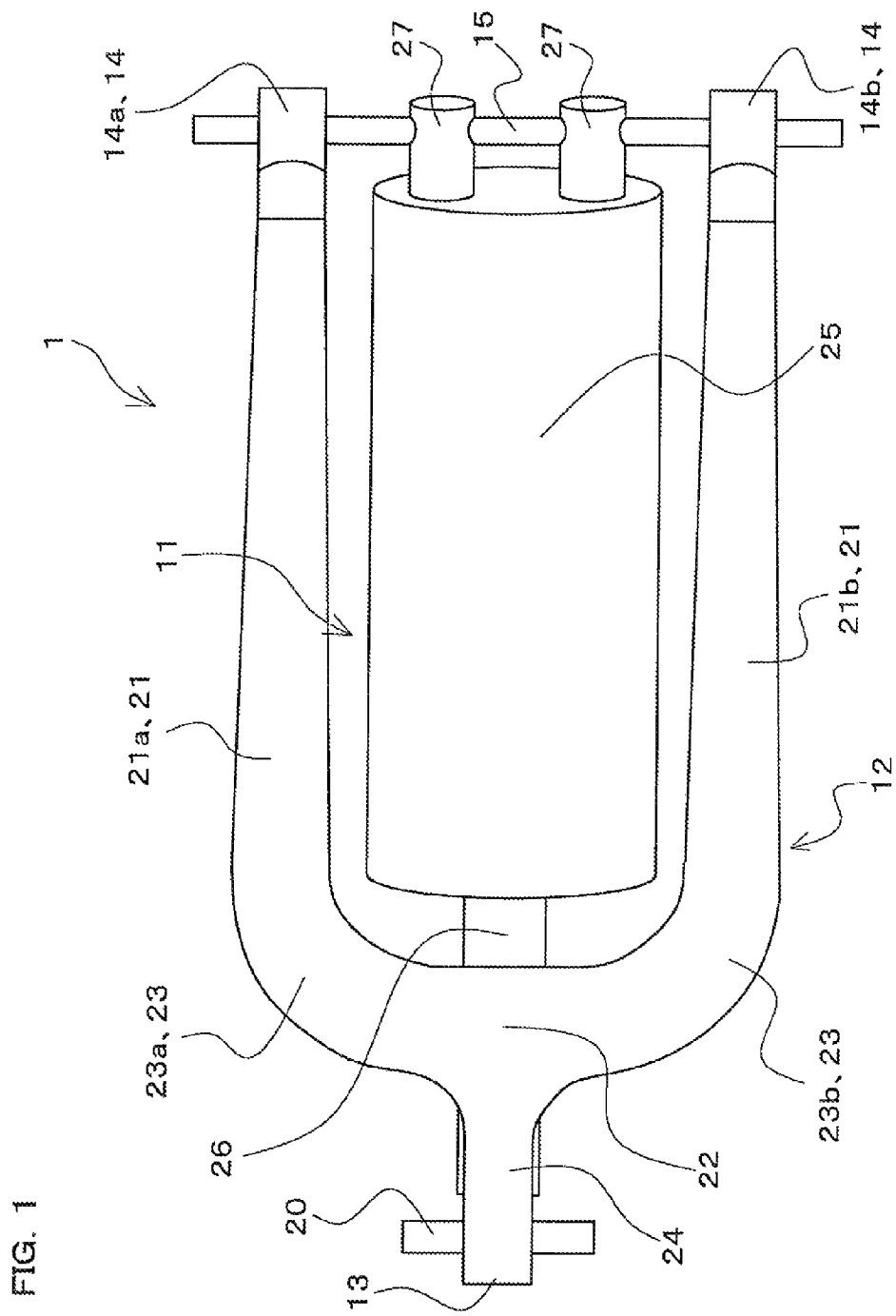
FIG. 1 is a plan view showing an aircraft actuator according to an embodiment of the present invention.
Figure 2:
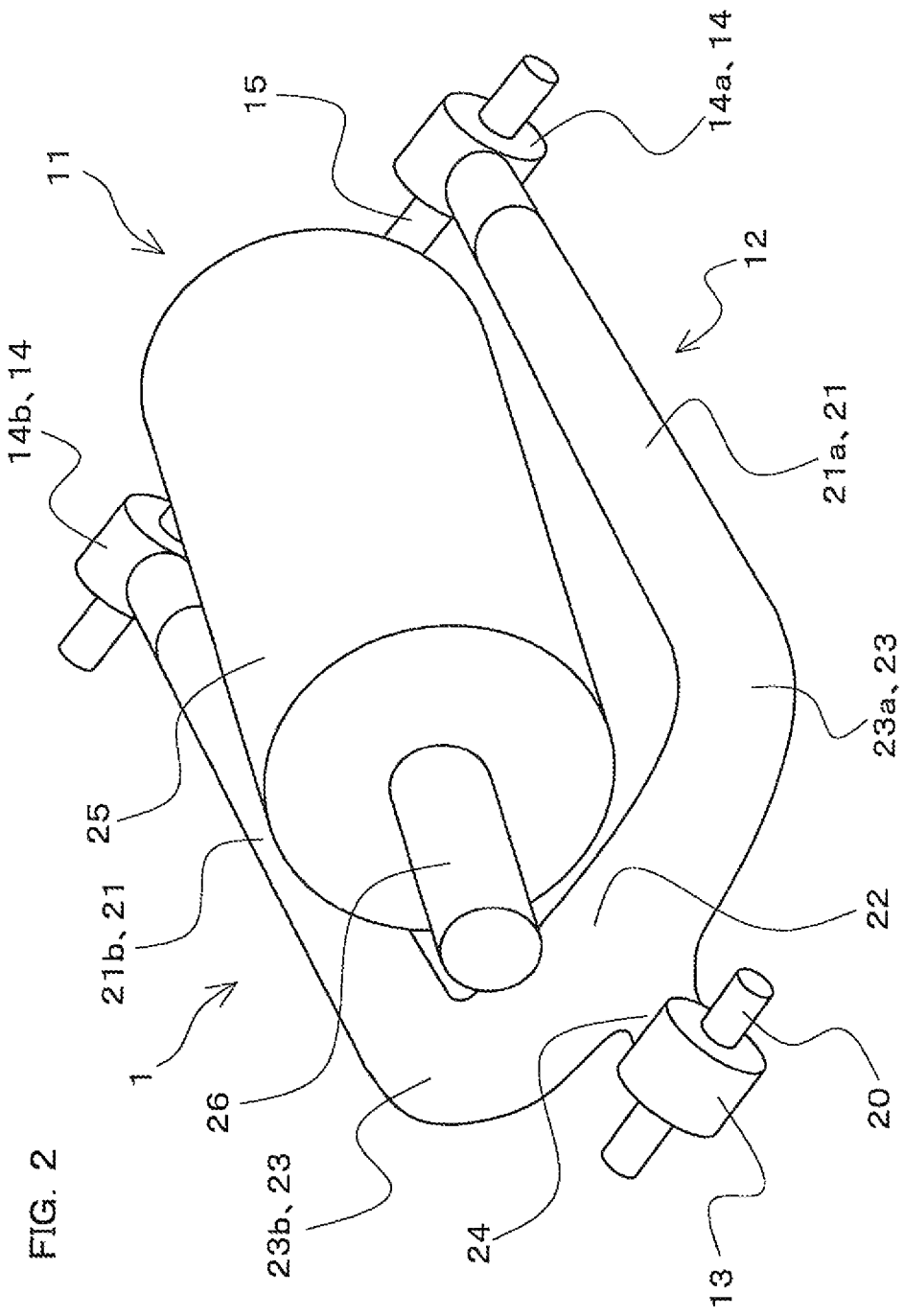
FIG. 2 is a perspective view showing the aircraft actuator shown in FIG. 1, with the bottom side facing up.

FIG. 1 is a plan view showing an aircraft actuator 1 (hereinafter, may be simply referred to as "actuator 1") according to one embodiment of the present invention. FIG. 2 is a perspective view showing the actuator 1 shown in FIG. 1, with the bottom side facing up. The actuator 1 shown in FIGS. 1 and 2 is attached in an aircraft, and is used to drive control surfaces provided as moving surfaces (flight control surfaces) of the aircraft and configured as an aileron, a rudder, an elevator, and the like. The actuator 1 can also be used to drive control surfaces configured as a flap, a spoiler, and the like.

As shown in FIGS. 1 and 2, the actuator 1 includes a cylinder 11, a reaction link 12, a control surface-side bearing portion 13, wing fixing-side bearing portions 14, a pivot shaft 15, and so on. The cylinder 11 is provided as a cylinder driven by hydraulic pressure, and includes a cylinder body 25 and a rod portion 26. The cylinder 11 is actuated by supplying and discharging pressure oil to and from the inside of the cylinder body 25 using a hydraulic system (not shown) provided in an aircraft (not shown), and the rod portion 26 is actuated such that it is displaced so as to project or retract from or into the cylinder body 25. Further, at the tip end of the rod portion 26, which is located at one end of the cylinder 11, the cylinder 11 is attached pivotally with respect to a control surface (not shown) of the aircraft via a hinge portion (not shown) or the like. Note that the tip end of the rod portion 26 need not be directly attached to the control surface, and may be attached pivotally with respect to the horn arm member attached to the control surface.

Figure 3:
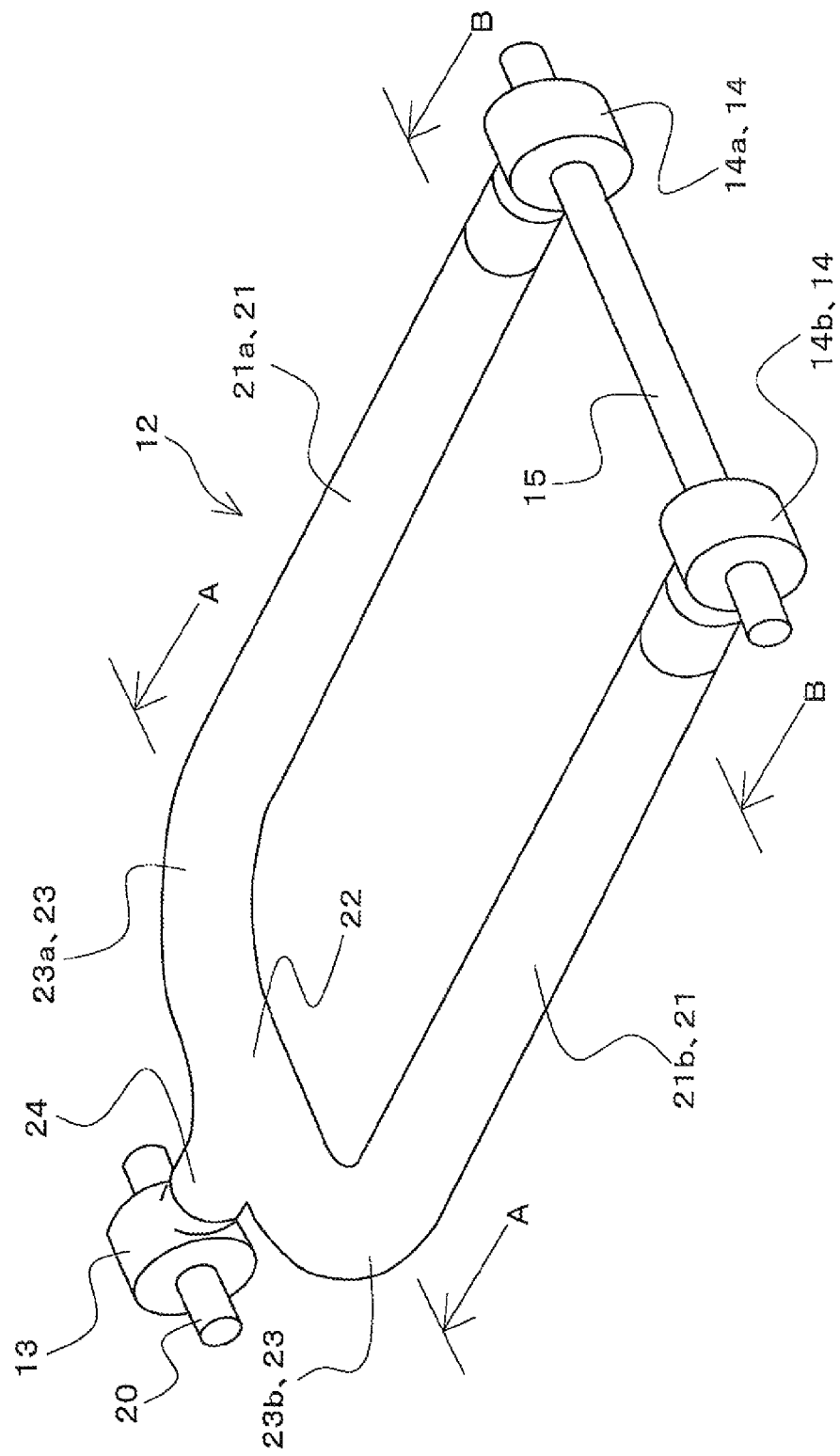
FIG. 3 is a perspective view showing the reaction link in the aircraft actuator shown in FIG. 1.

FIG. 3 is a perspective view showing the reaction link 12. The reaction link 12 shown in FIGS. 1 to 3 is made of carbon fiber reinforced plastic (CFRP). Also, the reaction link 12 is provided as a link member formed in the shape of a portal, and includes a pair of linear portions 21 (21a, 21b), a coupling portion 22, and a pair of bent portions 23 (23a, 23b).

Although this embodiment is described taking, as an example, a case in which the reaction link 12 is made of carbon fiber reinforced plastic, this need not be the case; the reaction link 12 may be made of fiber reinforced plastic other than carbon fiber reinforced plastic. For example, the reaction link 12 may be made of fiber reinforced plastic such as glass fiber reinforced plastic (GFRP), glass mat reinforced plastic (GMT), boron fiber reinforced plastic (BFRP), aramid fiber reinforced plastic (AFRP), polyethylene fiber reinforced plastic, and Zylon fiber reinforced plastic (ZFRP).

The pair of linear portions 21 in the reaction link 12 are made up of a linear portion 21a and a linear portion 21b disposed substantially parallel to each other and each extending linearly. The coupling portion 22 is formed as a portion extending so as to couple one end of each of the pair of linear portions 21 on the same side to each other. Note that the coupling portion 22 is formed so as to extend in a direction substantially orthogonal to the linear portion 21a and the linear portion 21b, and couple one end of the linear portion 21a to one end of the linear portion 21b. The pair of bent portions 23 are formed as connection portions between the coupling portion 22 and the pair of linear portions 21, and are made up of a bent portion 23a and a bent portion 23b. Note that bent portion 23a and the bent portion 23b are formed as elbow-shaped portions that are bent at substantially a right angle, with the bent portion 23a connecting the coupling portion 22 with the linear portion 21a, and the bent portion 23b connecting the coupling portion 22 with the linear portion 21b.

The reaction link 12 is also provided with a protruding portion 24 formed protruding at a center portion of the coupling portion 22. Also, the control surface-side bearing portion 13 is provided at the tip of the protruding portion 24. The control surface-side bearing portion 13 includes a bearing for attaching the protruding portion 24 pivotally with respect to a fulcrum shaft 20 serving as a pivot fulcrum of the pivotally supported control surface (not shown). Accordingly, the reaction link 12 is provided such that the center portion of the coupling portion 22 is provided pivotally with respect to the control surface.

The reaction link 12 is also provided with the pair of wing fixing-side bearing portions 14 at the other ends of the pair of linear portions 21 that are opposite from the coupling portion 22. The pair of wing fixing-side bearing portions 14 are made up of a wing fixing-side bearing portion 14a provided at the other end of the linear portion 21a and a wing fixing-side bearing portion 14b provided at the other end of the linear portion 21b. Also, the wing fixing-side bearing portion 14a and the wing fixing-side bearing portion 14b include bearings for respectively attaching the linear portion 21a and the linear portion 21b pivotally with respect to the pivot shaft 15. Note that both ends of the pivot shaft 15 are coupled to specific fixing portions of a wing (not shown) to which the control surface is pivotally supported. As clearly shown in FIG. 1, multiple (in this embodiment, two) attachment portions 27 provided at the other end (the side opposite from the side where the rod portion 26 protrudes) of the cylinder body 25 of the cylinder 11 are attached pivotally with respect to the pivot shaft 15. Accordingly, the cylinder body 25 is, at its other end, supported pivotally with respect to the pivot shaft 15. With such a configuration, the reaction link 12 is provided such that the other end of each of the pair of linear portions 21 is provided pivotally with respect to the other end of the cylinder 11 via the pair of wing fixing-side bearing portions 14 and the pivot shaft 15.

Figure 4:
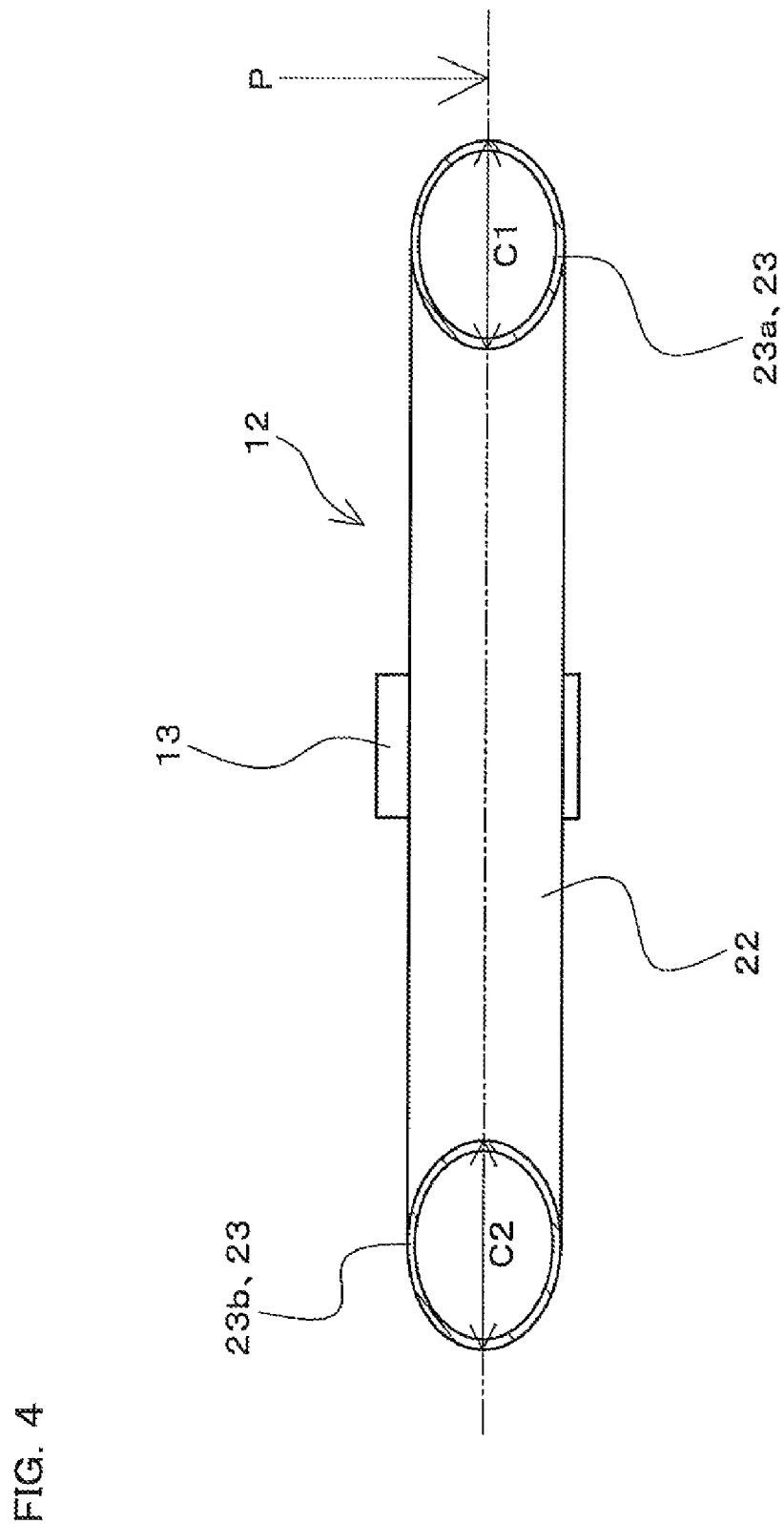
FIG. 4 is a cross-sectional view looking in the direction of arrows A-A in FIG. 3.
Figure 5:
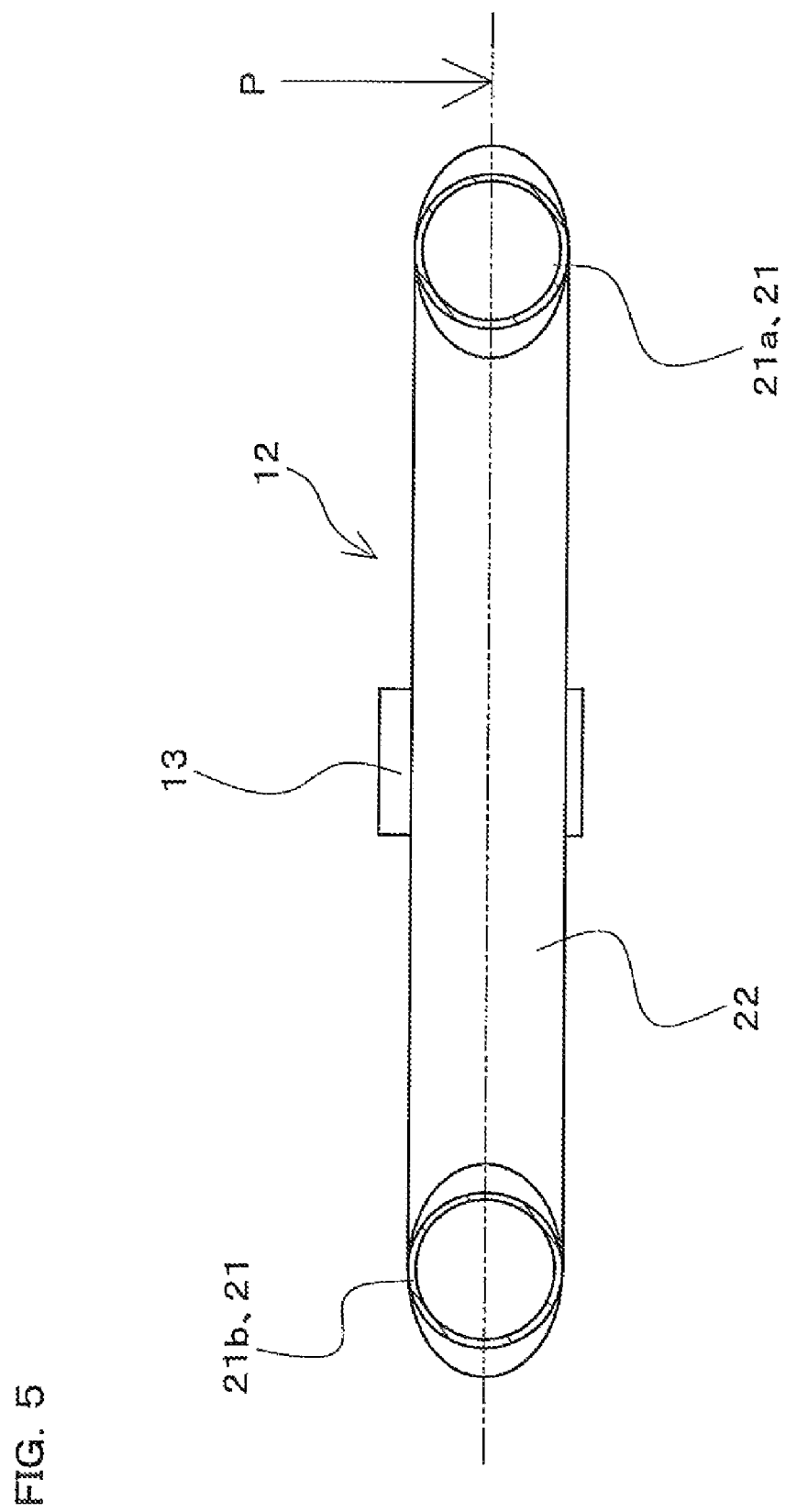
FIG. 5 is a cross-sectional view looking in the direction of arrows B-B in FIG. 3.

FIG. 4 is a cross-sectional view looking in the direction of arrows A-A in FIG. 3, and FIG. 5 is a cross-sectional view looking in the direction of arrows B-B in FIG. 3. The reaction link 12 shown in FIG. 3 to FIG. 5 is provided as a hollow member whose cross section at the pair of linear portions 21, the coupling portion 22, and the pair of bent portions 23 is formed as a hollow cross section. That is, the reaction link 12 is provided as a tubular hollow member having a communicating hollow portion therein and extending in the shape of a portal.

The hollow cross section at each of the pair of bent portions 23 (23a, 23b) is configured as a cross section whose outer perimeter and inner perimeter are formed in an elliptical shape. Furthermore, as clearly shown in FIG. 4, the pair of bent portions 23 (23a, 23b) are formed such that the major axes (major axis C1 and major axis C2, indicated by the double-ended arrows in the drawing) of the elliptical shape of the hollow cross section are disposed along the same virtual plane (plane P, indicated by the chain double-dashed line in the drawing). That is, the major axis C1 of the elliptical shape of the hollow cross section at the bent portion 23a and the major axis C2 of the elliptical shape of the hollow cross section at the bent portion 23b are disposed along the same plane P.

Furthermore, in addition to carbon fiber disposed extending along the lengthwise direction of the reaction link 12 (the direction in which the pair of linear portions 21, the coupling portion 22, and the pair of bent portions 23 extend as a tubular body), carbon fiber wound along the circumferential direction of the elliptical shape of the hollow cross section is disposed at the pair of bent portions 23. That is, carbon fiber wound in a direction substantially orthogonal to the lengthwise direction of the reaction link 12 is also provided at each of the pair of bent portions 23 (23a, 23b).

Buckling modes, which are patterns of buckling deformation in the reaction link 12, include a buckling mode in which the reaction link 12 buckles such that it bulges outward and thus collapses and a buckling mode in which the reaction link 12 buckles inward and thus collapses. As described above, in the reaction link 12, carbon fiber is wound along the circumferential direction of the elliptical shape of the hollow cross section, thus making it possible to suppress the occurrence of delamination of the carbon fiber, and effectively prevent the occurrence of the buckling mode in which the reaction link 12 buckles such that it bulges outward and thus collapses. On the other hand, the buckling mode in which the reaction link 12 collapses inward can be prevented effectively by providing the actuator 1 with a configuration in which the hollow portion inside the hollow cross section in the reaction link 12 is filled with a filler such as a light foam material. In the case of producing an actuator 1 in which the interior of the reaction link 12 is filled with a foam material, it is possible to choose a method in which a core that is initially configured as a foam material is fabricated, in order to secure the shape stability of the reaction link 12 as a molded article, and a sheet of a composite material made of carbon fiber reinforced plastic (or another fiber reinforced plastic) is wound around the core. In this case, the core is configured to have an outer cross-sectional dimension that is smaller by the thickness of the composite material than the outer cross-sectional dimension of the molded article serving as the reaction link 12. In addition, since the core is molded using, for example, a mold, it is possible to readily achieve a stable shape and dimensional accuracy. Accordingly, forming a reaction link 12 by winding a sheet of a composite material around this core makes it possible to readily obtain a reaction link 12 for which a stable shape and dimensional accuracy can be achieved. Then, after winding the composite material sheet around the core, the core is inserted into a female mold, and pressurized and heated, and thereby, it is possible to obtain a reaction link 12 having higher precision shape and dimensions. Note that, as the method for producing an actuator 1 in which the interior of the reaction link 12 is filled with a foam material, it is also possible to choose a method different from the above-described method in which a composite material sheet is wound around the core. For example, it is possible to choose a method in which a sheet of a composite material is initially molded in a shape corresponding to the shape of the reaction link 12, and after inserting the thus obtained molded article into a mold, a foamable material is injected into the mold, and molded by heating while increasing the internal pressure.

On the other hand, the hollow cross section at each of the pair of linear portions 21 is configured such that it gradually changes from a cross section whose outer perimeter and inner perimeter are formed in an elliptical shape to a cross section whose outer perimeter and inner perimeter are formed in an circular shape (see FIG. 5). Also, the hollow cross section at the other end of each of the linear portions (21a, 21b) is configured as a circular cross section having a diameter dimension substantially the same as the length dimension of the minor axis orthogonal to each of the major axis (C1, C2) of the bent portions (23a, 23b). That is, the cross section at each of the pair of linear portions 21 is formed such that it changes from a cross section of an elliptical shape to a cross section of a circular shape from one end to the other end, with the dimension of the minor axis being constant, and the dimension of the major axis (C1, C2) changing so as to approach the dimension of the minor axis (the aspect ratio, the ratio between the major axis and the minor axis, changing) from one end to the other end. Accordingly, the reaction link 12 is formed such that the outer cross-sectional area (the cross-sectional area including the hollow portion in the inner region surrounded by the outer perimeter of the hollow cross section) of the hollow cross section at each of the pair of bent portions 23 (23a, 23b) is larger than the outer cross-sectional area of the hollow cross section at each of the pair of linear portions 21 (21a, 21b). Further, the pair of linear portions 21 (21a, 21b) are formed such that the outer cross-sectional area of the hollow cross section at each of the linear portions 21 gradually decreases toward the other end. Thus, the reaction link 12 is formed such that the geometrical moment of inertia is larger at the pair of bent portions 23, which tend to be subjected to a larger compressive load, and the geometrical moment of inertia gradually decreases as the side of the pivot shaft 15 is approached. Note that carbon fiber that is wound along the circumferential direction of the elliptical shape or the circular shape of the hollow cross section may also disposed at the pair of linear portions 21, as with the pair of bent portions 23.

In the following, the operation of the actuator 1 described above will be described. When a control surface is driven, a hydraulic system is actuated in accordance with an instruction from a controller (not shown), and pressure oil is supplied and discharged to and from the cylinder body 25 of the cylinder 11. As a result of supplying/discharging pressure oil, the rod portion 26 is displaced such that it projects or retracts from or into the cylinder body 25. Consequently, the control surface is driven at one end of the rod portion 26 of the cylinder 11 that is, at its other end, supported pivotally with respect to the pivot shaft 15 fixed at the fixing position of the wing. As described above, at this time, the reaction link 12 is, on its one side, attached pivotally with respect to the fulcrum shaft 20 of the control surface, and is, on its other side, attached pivotally with respect to the pivot shaft 15 fixed to the fixing portion of the wing; accordingly, the control surface is driven so as to pivot about the fulcrum shaft 20.

When lift is exerted on the control surface, a large compressive load that is exerted along the lengthwise direction of the pair of linear portions 21 is generated in the reaction link 12. At this time, the largest compressive load is generated at each of the pair of bent portions 23, which are bent at substantially at a right angle to the pair of linear portions 21. Also, a load that causes a deformation pattern in which deformation occurs in the direction along the virtual plane P described above is generated at the pair of bent portions 23. However, the geometrical moment of inertia is larger at the pair of bent portions 23 than at the pair of linear portions 21, and the pair of bent portions 23 are formed so as to have a hollow cross section of an elliptical shape whose major axis (C1, C2) is disposed along the plane P and thus a sufficient buckling strength is secured; therefore, the above-described buckling deformation due to a compressive load will be sufficiently suppressed.

As has been described thus far, with the aircraft actuator 1, the reaction link 12 including the pair of linear portions 21, the coupling portion 22, and the pair of bent portions 23 is made of fiber reinforced plastic as a hollow member formed such that the cross section at each of the above-described portions (21 to 23) is a hollow cross section. This enables a significant weight reduction as compared to an aircraft actuator that uses a conventional reaction link made of a metal such as titanium alloy. For fiber reinforced plastic, a sufficient tensile strength can be readily secured, but the compressive strength and buckling strength are lower relative to the tensile strength. Therefore, it is particularly important to suppress buckling deformation and secure a buckling strength at the pair of bent portions 23. In this respect, with the aircraft actuator 1, the reaction link 12 is formed such that the outer cross-sectional area of the hollow cross section at the pair of bent portions 23 is larger than that at the pair of linear portions 21. This makes it possible to dispose a larger amount of the fiber reinforced plastic serving as the constituent material at the bent portions (23a, 23b), where a higher buckling strength is required, and decrease the amount of the constituent material at the linear portions (21a, 21b), where only a low buckling strength is required, within the range that can secure the required strength. Accordingly, it is possible to achieve an efficient arrangement of the constituent material for securing a buckling strength in addition to a tensile strength, thus achieving a further weight reduction while securing a sufficient buckling strength.

Thus, with this embodiment, it is possible to provide an aircraft actuator 1 that can achieve a significant weight reduction, while securing a sufficient tensile strength and a sufficient buckling strength, even if it is provided with a reaction link 12 in which large bent portions (23a, 23b) are formed.

Furthermore, with the aircraft actuator 1, the bent portions (23a, 23b) are formed so as to have a hollow cross section whose outer perimeter and inner perimeter are formed in an elliptical shape. By forming the bent portions (23a, 23b) so as to have a hollow cross section of an elliptical shape, the occurrence of concentration of stress can be more suppressed than in the case of forming the bent portions so as to have a cross section of a rectangular shape. Also, by disposing the major axis (C1, C2) of the cross section of an elliptical shapes along the direction in which a large buckling strength is required, the bent portions (23a, 23b) can be formed so as to have a large thickness in the direction in which the buckling strength is required. Accordingly, it is possible to achieve a further efficient arrangement of the constituent material for securing a buckling strength at the bent portions (23a, 23b), thus securing a sufficient buckling strength and achieving a further weight reduction.

Furthermore, with the aircraft actuator 1, the pair of bent portions 23 are formed such that the directions of the major axes (C1, C2) of the cross section of an elliptical shape at the pair of bent portions 23 are disposed along the same plane P. Accordingly, at the pair of bent portions 23, the directions of the major axes (C1, C2) of the cross section of an elliptical shape are aligned with each other along the direction in which a large buckling strength is required. This makes it possible to increase the thickness of the two bent portions (23a, 23b) in the direction in which a buckling strength is required, and decrease the thickness thereof in the minor axis direction, which is orthogonal to the aforementioned direction. Accordingly, it is possible to achieve a further efficient arrangement of the constituent material for securing a buckling strength at the two bent portions (23a, 23b), thus securing a sufficient buckling strength and achieving a further weight reduction.

Furthermore, with the aircraft actuator 1, carbon fiber is wound in the circumferential direction at the bent portions (23a, 23b) of the reaction link 12 that is made of carbon fiber reinforced plastic having a high strength and for which a significant weight reduction has been achieved. Accordingly, at the bent portions (23a, 23b), where a larger buckling strength is required, it is possible to effectively suppress the occurrence of delamination of the carbon fiber in a direction orthogonal to the lengthwise direction of the reaction link 12.

Furthermore, with the aircraft actuator 1, the outer cross-sectional area of the hollow cross section at the pair of linear portions 21 is configured so as to gradually decrease. This makes it possible to dispose a larger amount of the fiber reinforced plastic serving as the constituent material at the end of each of the pair of linear portions 21 that is closer to the bent portions (23a, 23b), where a higher buckling strength is required, and gradually decrease the amount of the constituent material toward the other end, where only a low buckling strength is required, within the range that can secure the required strength, in an efficient manner. Accordingly, it is possible to achieve a further efficient arrangement of the constituent material, thus achieving a further weight reduction.

Here, in order to verify the effect of the aircraft actuator according to the present invention, a description will be given of results of an analysis in which a comparison was performed regarding the relationship between the cross sectional shape and the weight for reaction links having different cross-sectional shapes when they were formed to specifications of a cross-sectional that enable securing of a required buckling strength. Note that whether or not the specifications enable securing of the required buckling strength was determined by calculations using the finite element method. FIGS. 6 to 14 are perspective views showing analytic models of reaction links (W0, W1, W2, W3, W4, W5, W6, W7, W8) having different cross sectional shapes. The reaction links (W0 to W8) shown in FIGS. 6 to 14 each include a pair of linear portions, a coupling portion, and a pair of bent portions that are disposed so as to correspond to the pair of linear portions 21, the coupling portion 22, and the pair of bent portions 23 in the reaction link 12 of this embodiment. Also, the cross-sectional shapes at the pair of linear portions, the coupling portion, and the pair of bent portions are configured to be different in the reaction links (W0 to W8). Note that FIGS. 6 to 14 show perspective views of the reaction links (W0 to W8), showing the cross-sectional shape at the pair of linear portions in partially cutout cross-sectional views.

Figure 6:
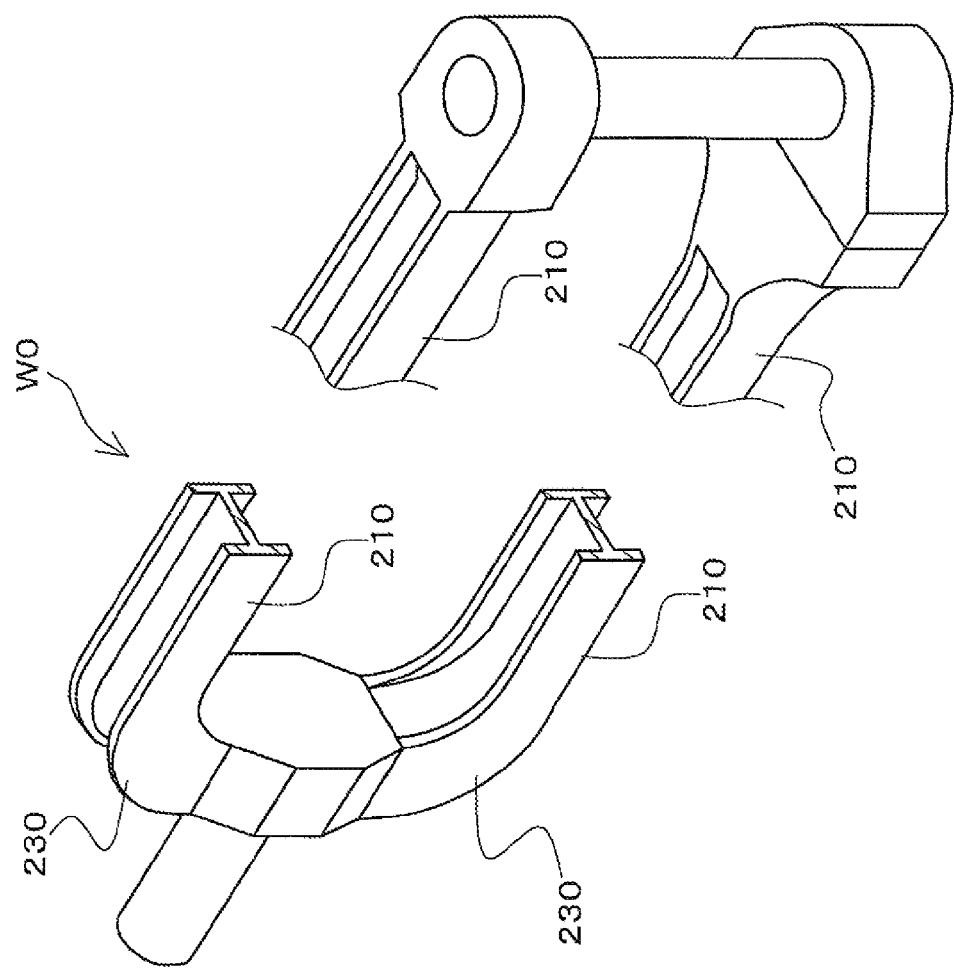
FIG. 6 is a perspective view showing an analytic model of a reaction link corresponding to a conventional technology.
Figure 7:
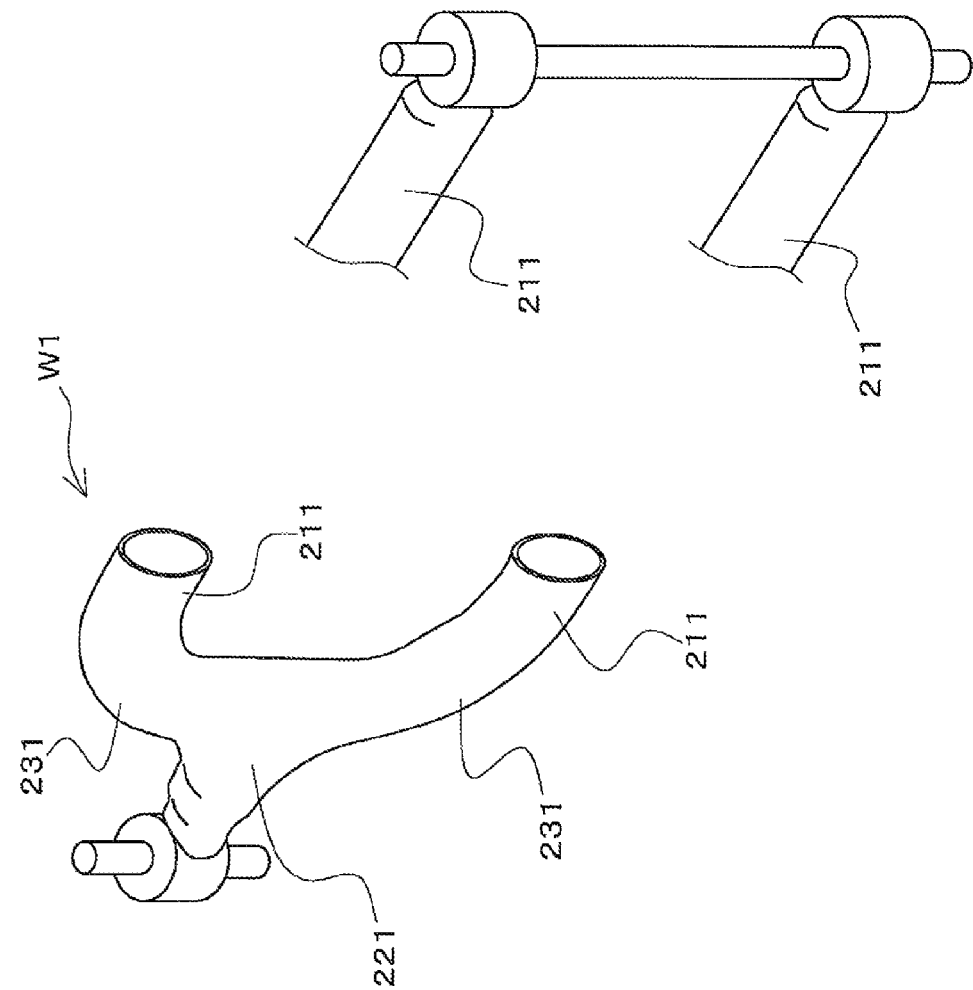
FIG. 7 is a perspective view showing an analytic model of a reaction link having a hollow cross section of an elliptical shape whose cross-sectional area does not change at a pair of linear portions.
Figure 8:
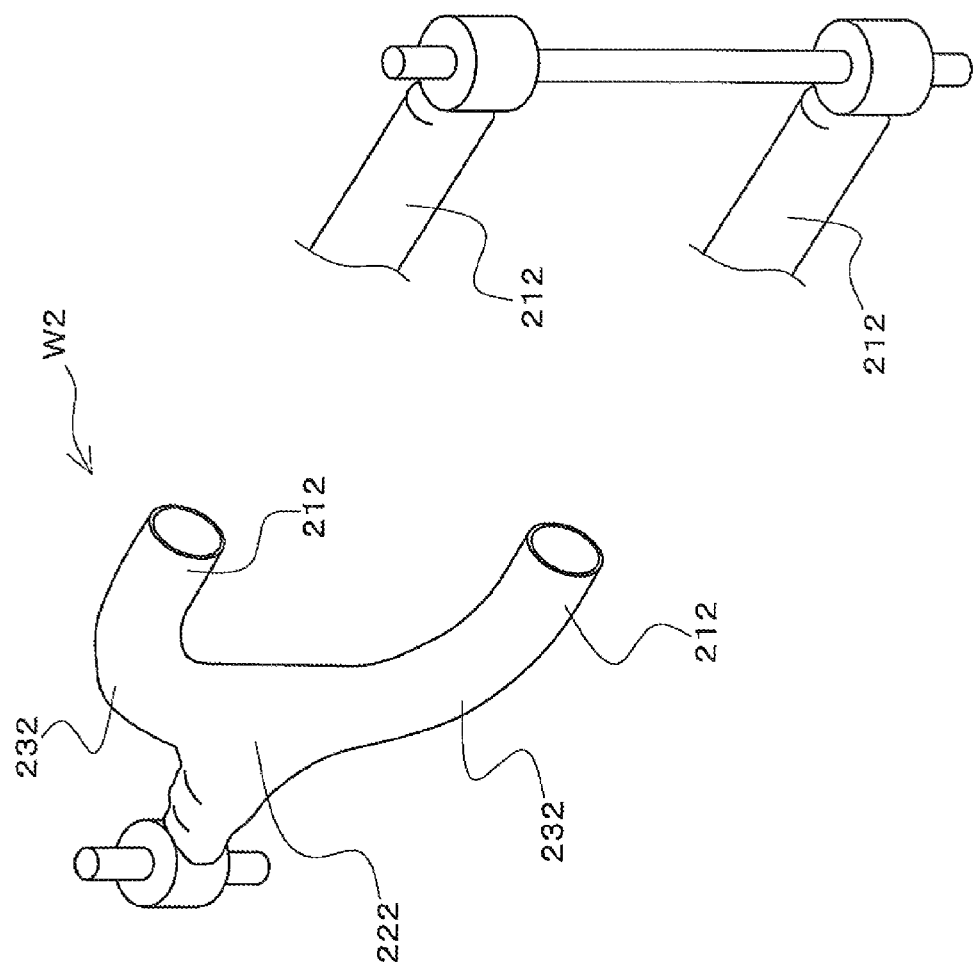
FIG. 8 is a perspective view showing an analytic model of a reaction link having a hollow cross section of a circular shape whose cross-sectional area does not change at a pair of linear portions.
Figure 9:
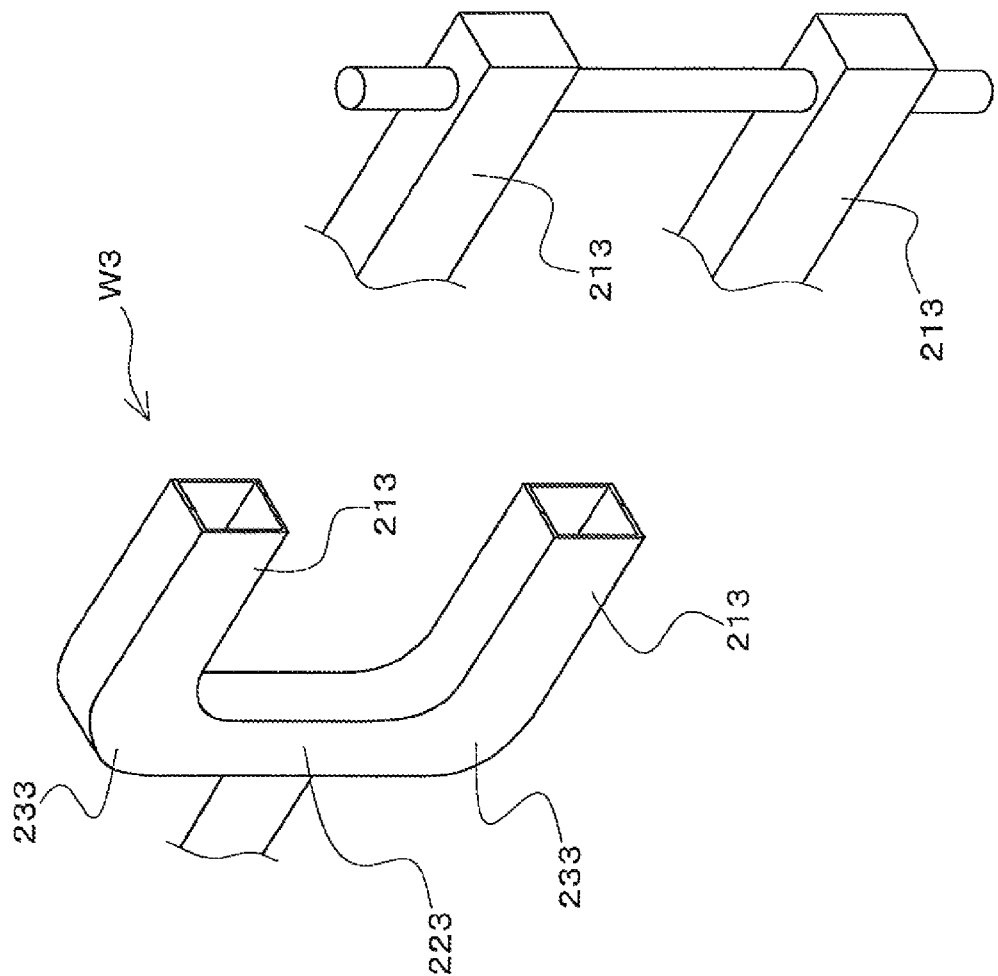
FIG. 9 is a perspective view showing an analytic model of a reaction link having a hollow cross section of a rectangular shape whose cross-sectional area does not change at a pair of linear portions.
Figure 10:
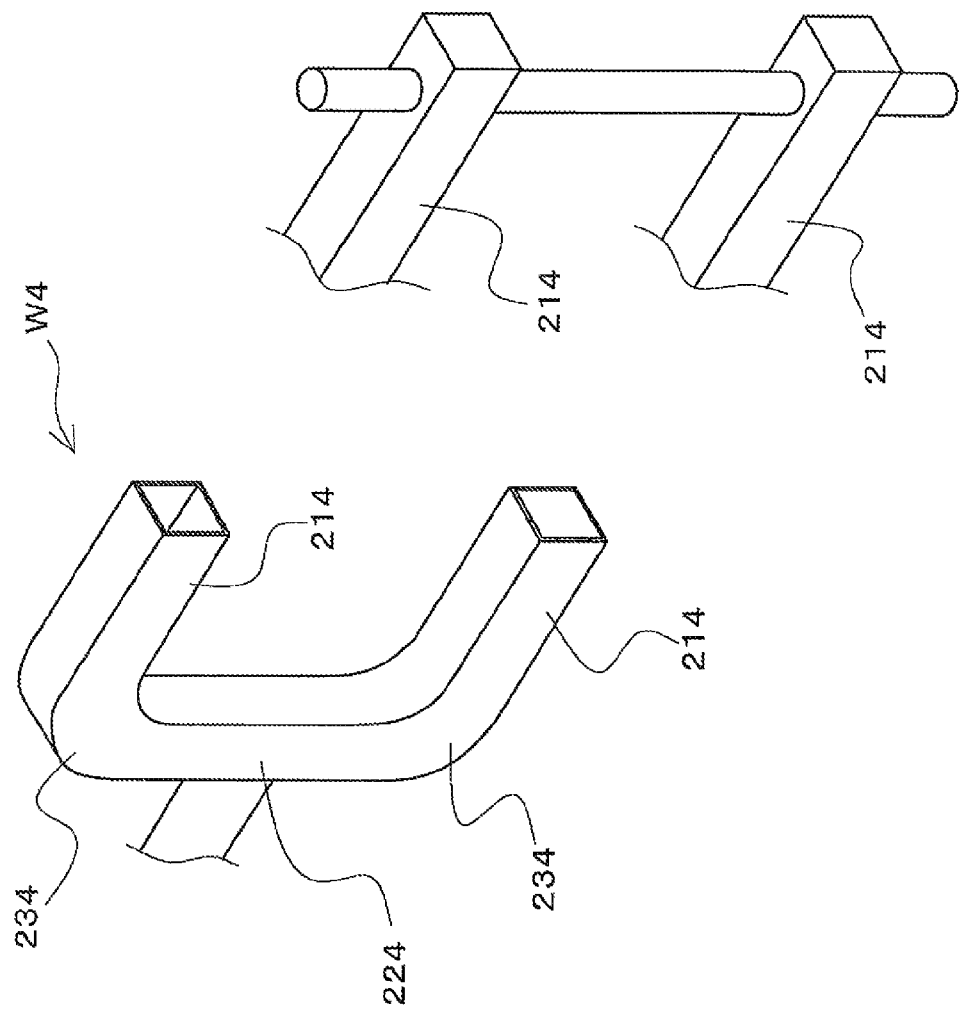
FIG. 10 is a perspective view showing an analytic model of a reaction link having a hollow cross section of a square shape whose cross-sectional area does not change at a pair of linear portions.

The reaction link W0 shown in FIG. 6 corresponds to a conventional technology. The reaction link W0 is made of titanium alloy, and is formed to have a cross section of an I-shape in which a flange portion is formed at each end in the width direction of the cross section at a pair of bent portions 230 and a pair of linear portions 210. In contrast, the reaction links (W1 to W8) shown in FIGS. 7 to 14 are made of carbon fiber reinforced plastic. The reaction link W1 shown in FIG. 7 is formed such that a pair of linear portions 211, a coupling portion 221, and a pair of bent portions 231 have a hollow cross section of an elliptical shape, and that the outer cross-sectional area of the hollow cross section of the pair of linear portions 211 is the same as the outer cross-sectional area of the hollow cross section of the pair of bent portions 231, and does not change. The reaction link W2 shown in FIG. 8 is formed such that a pair of linear portions 212, a coupling portion 222, and a pair of bent portions 232 have a hollow cross section of a circular shape, and that the outer cross-sectional area of the hollow cross section of the pair of linear portions 212 is the same as the outer cross-sectional area of the hollow cross section of the pair of bent portions 232, and does not change (that is, the reaction link W2 is formed in the shape of a cylinder). The reaction link W3 shown in FIG. 9 is formed such that a pair of linear portions 213, a coupling portion 223, and a pair of bent portions 233 have a hollow cross section of a rectangular shape, and that the outer cross-sectional area of the hollow cross section of the pair of linear portions 213 is the same as the outer cross-sectional area of the hollow cross section of the pair of bent portions 233, and does not change (that is, the reaction link W3 is formed in the shape of a quadrangular tube having a cross section of a rectangular shape). The reaction link W4 shown in FIG. 10 is formed such that a pair of linear portions 214, a coupling portion 224, and a pair of bent portions 234 have a hollow cross section of a square shape, and that the outer cross-sectional area of the hollow cross section of the pair of linear portions 214 is the same as the outer cross-sectional area of the hollow cross section of the pair of bent portions 234, and does not change (that is, the reaction link W4 is formed in the shape of a quadrangular tube having a cross section of a square shape).

Figure 11:
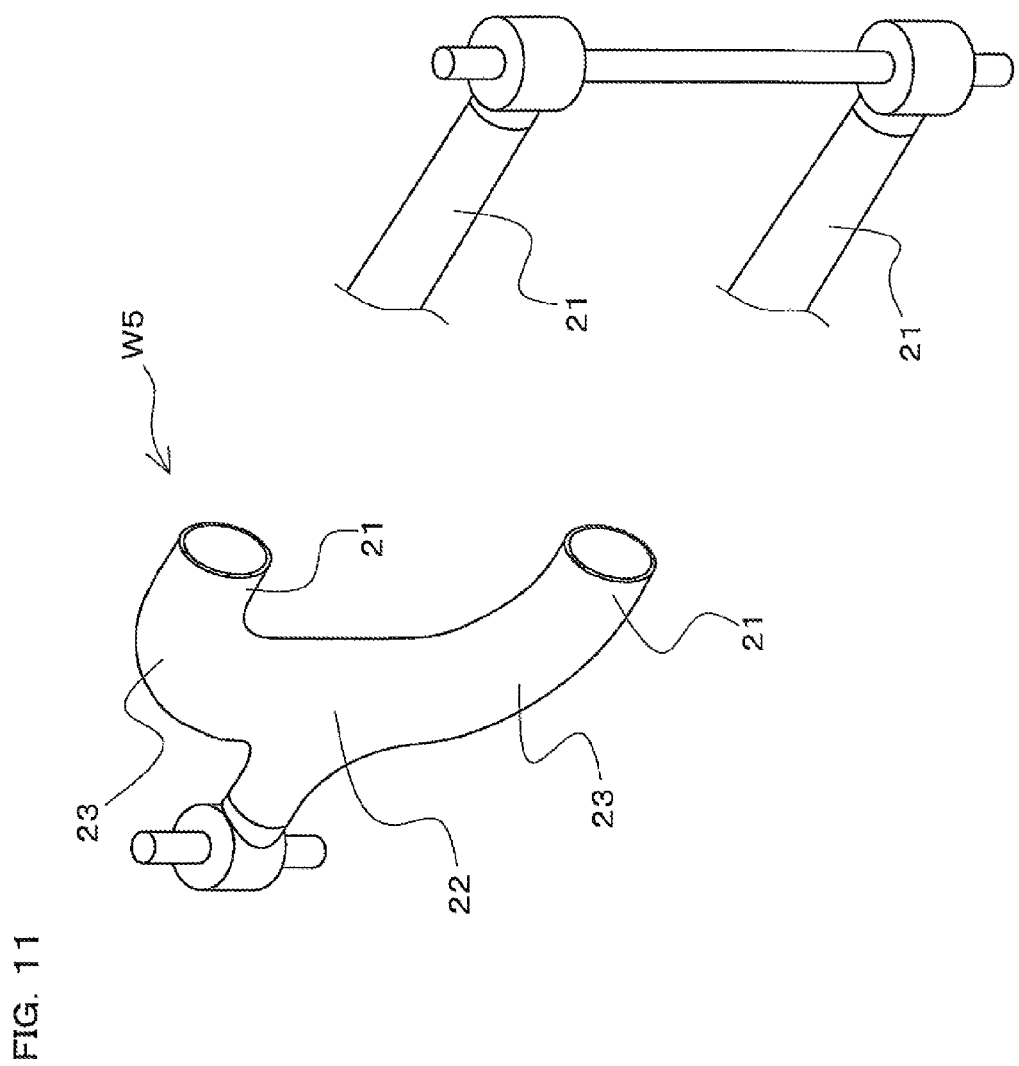
FIG. 11 is a perspective view showing an analytic model corresponding to the reaction link shown in FIG. 3.
Figure 12:
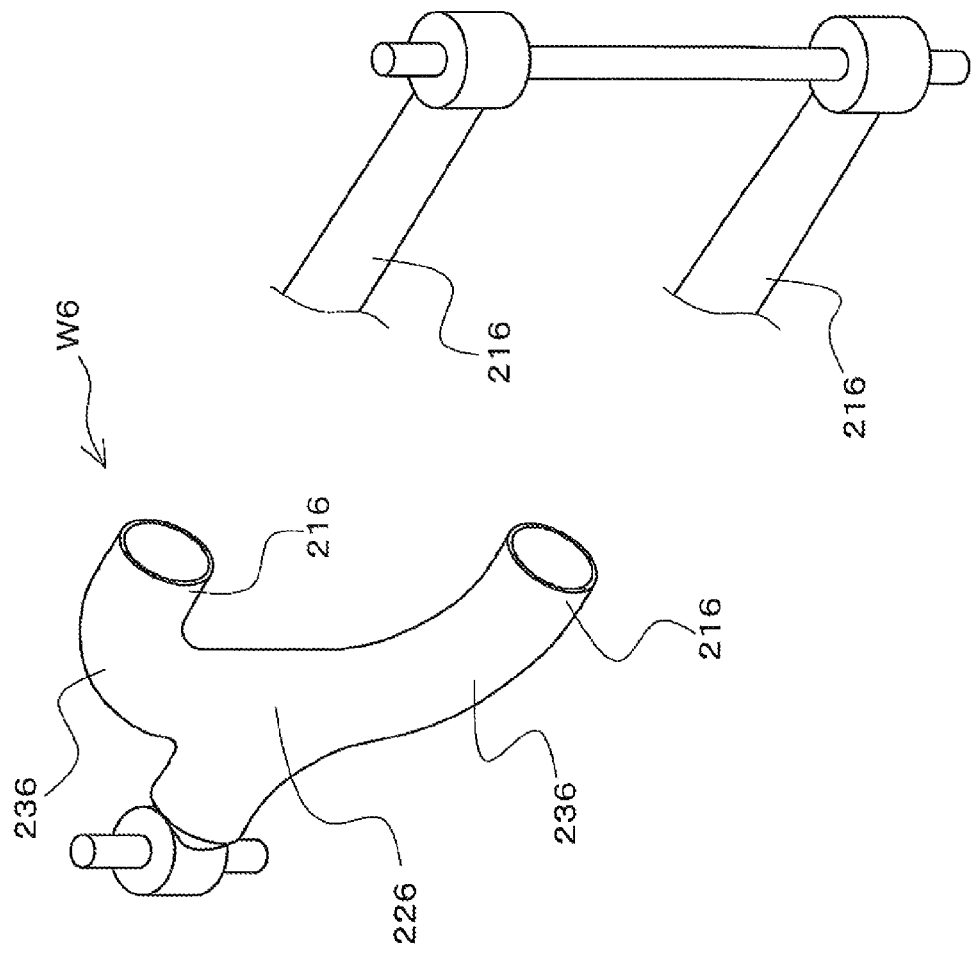
FIG. 12 is a perspective view showing an analytic model of a reaction link having a hollow cross section of a circular shape whose cross-sectional area changes so as to decrease at a pair of linear portions.
Figure 13:
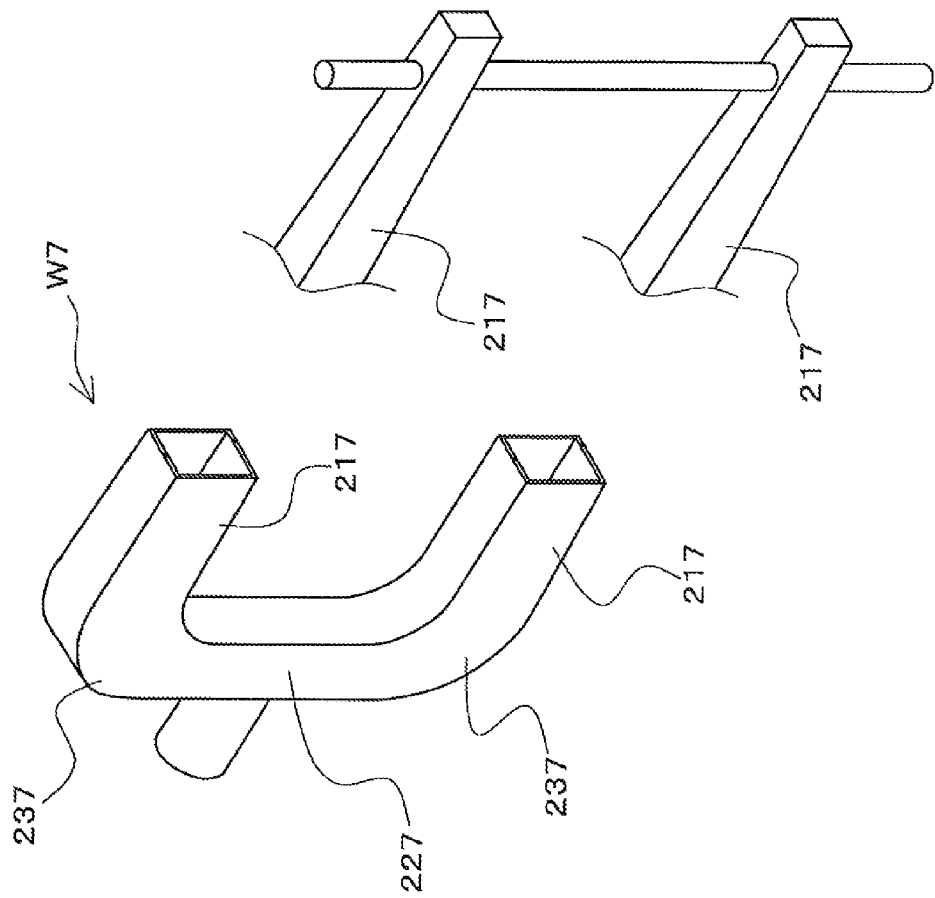
FIG. 13 is a perspective view showing an analytic model of a reaction link having a hollow cross section of a rectangular shape whose cross-sectional area changes so as to decrease at a pair of linear portions.
Figure 14:
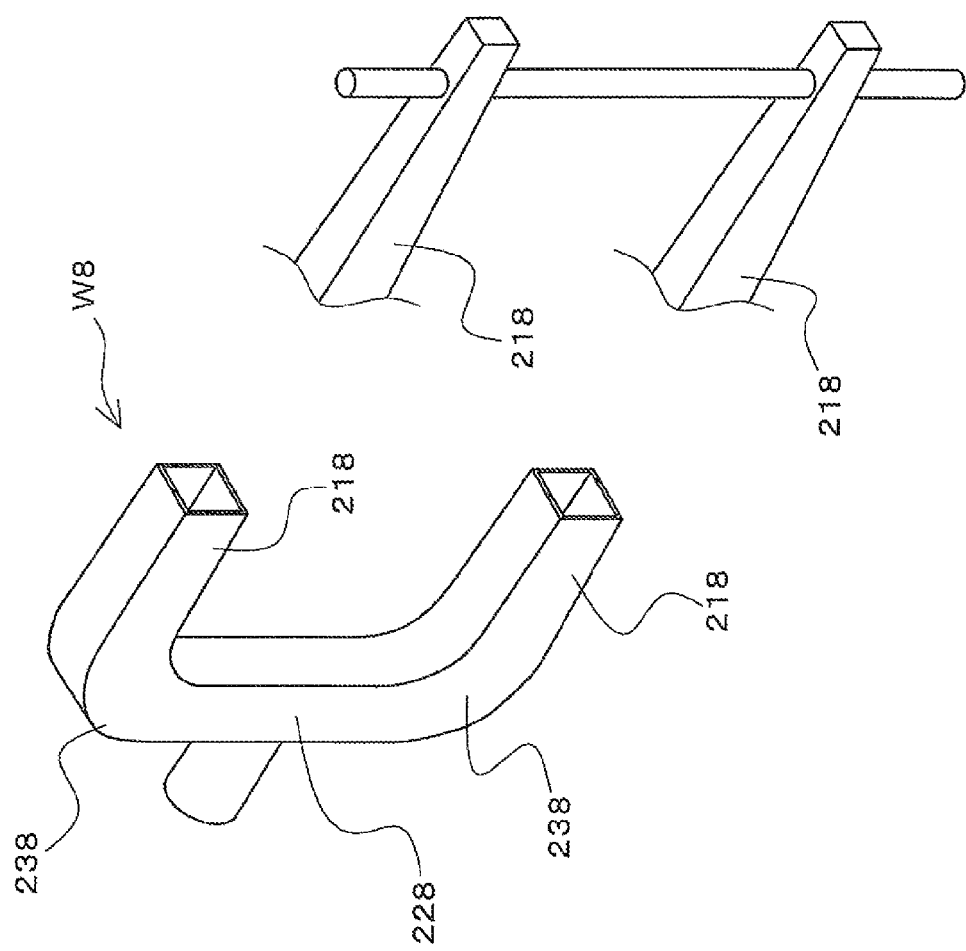
FIG. 14 is a perspective view showing an analytic model of a reaction link having a hollow cross section of a square shape whose cross-sectional area changes so as to decrease at a pair of linear portions.

The reaction link W5 shown in FIG. 11 is configured in the same manner as the reaction link 12 of this embodiment. That is, the reaction link W5 is formed such that the pair of linear portions 21, the coupling portion 22, and the pair of bent portions 23 have a hollow cross section, with the pair of bent portions 23 being formed so as to have a hollow cross section of an elliptical shape, and the pair of linear portions 21 being formed such that, as the other end is approached, the cross section of an elliptical shape changes into a cross section of a circular shape and the outer cross-sectional area of the hollow cross section gradually decreases. The reaction link W6 shown in FIG. 12 is formed such that a pair of linear portions 216, a coupling portion 226, and a pair of bent portions 236 have a hollow cross section of a circular shape, and that the outer cross-sectional area of the hollow cross section of the pair of linear portions 216 is smaller than the outer cross-sectional area of the hollow cross section of the pair of bent portions 236 and gradually decreases toward the other end. The reaction link W7 shown in FIG. 13 is formed such that a pair of linear portions 217, a coupling portion 227, and a pair of bent portions 237 have a hollow cross section of a rectangular shape, and that the outer cross-sectional area of the hollow cross section of the pair of linear portions 217 is smaller than the outer cross-sectional area of the hollow cross section of the pair of bent portions 237 and gradually decreases toward the other end. The reaction link W8 shown in FIG. 14 is formed such that a pair of linear portions 218, a coupling portion 228, and a pair of bent portions 238 have a hollow cross section of a square shape, and that the outer cross-sectional area of the hollow cross section of the pair of linear portions 218 is smaller than the outer cross-sectional area of the hollow cross section of the pair of bent portions 238 and gradually decreases toward the other end.

Figure 15:
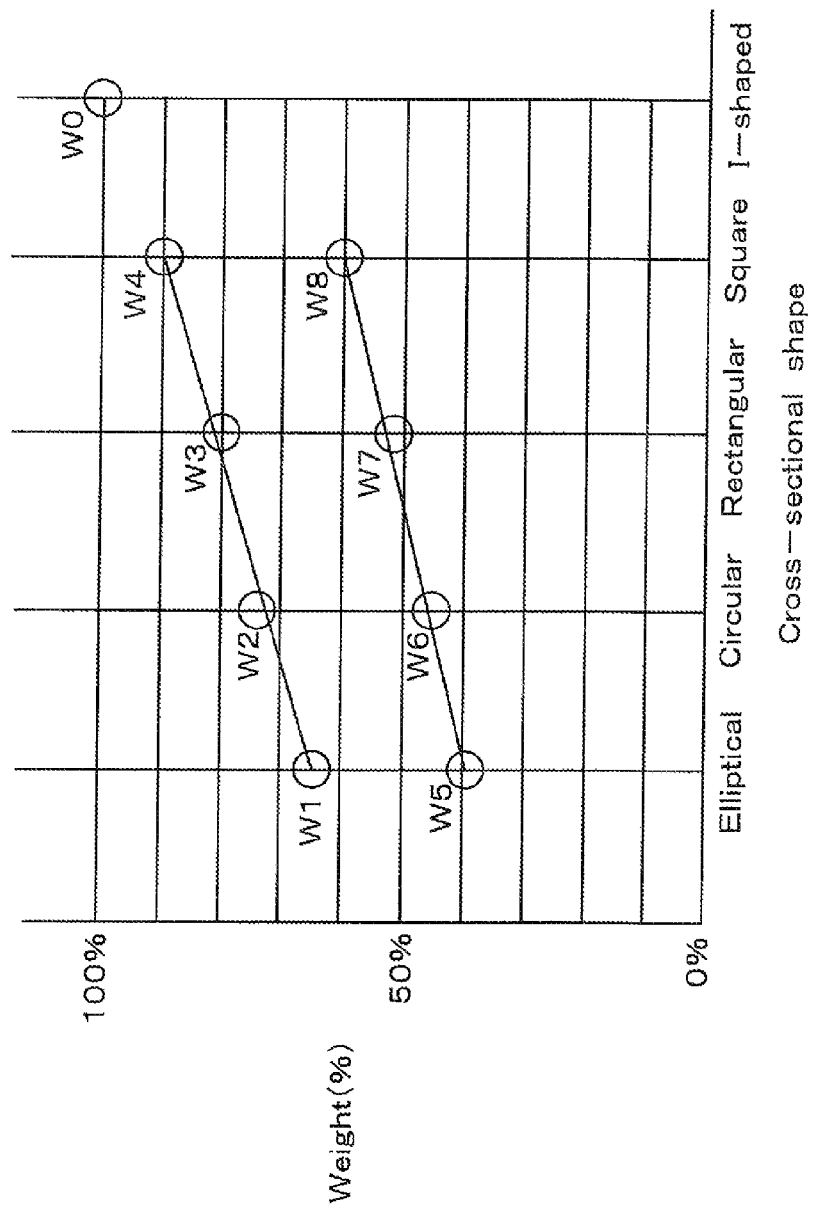
FIG. 15 is a graph showing results an analysis in which a comparison was performed regarding the weights of reaction links that were formed to specifications of a cross-sectional area that enable securing of a required buckling strength, using the analytic models shown in FIGS. 6 to 14.

FIG. 15 is a graph showing results of an analysis in which the weights (%) of the reaction links (W0 to W8) were calculated when they were formed to specifications of a cross-sectional area that enable securing of a required buckling strength, using the above-described analytic models, and the calculated weights are compared to the weight of the reaction link W0 (100%). Note that the weights (%) of the reaction links (W0 to W8) shown in FIG. 15 are the weights (%) when their cross-sectional shapes described above have been optimized to achieve their minimum weights at which a specific buckling strength can be secured.

As shown in FIG. 15, when the weight of the reaction link W0, which corresponds to a conventional technology, is taken as 100%, all of the reaction links (W1 to W8) made of carbon fiber reinforced plastic have achieved a weight reduction compared to the reaction link W0, while securing the required buckling strength. Also, in the case of the reaction links (W1 to W4) in which the outer cross-sectional area of the hollow cross section of the pair of linear portions is the same as the outer cross-sectional area of the hollow cross section of the pair of bent portions, and does not change, a weight reduction of about 90% for the cross section of a square shape (W4), a weight reduction of about 80% for the cross section of a rectangular shape (W3), a weight reduction of about 75% for the cross section of a circular shape (W2), and a weight reduction of about 65% for the cross section of an elliptical shape (W1) could be achieved. In contrast, in the case of the reaction links (W5 to W8) in which the outer cross-sectional area of the hollow cross section of the pair of linear portions is smaller than the outer cross-sectional area of the hollow cross section of the pair of bent portions and gradually decreases toward the other end, it was confirmed that a weight reduction of about 60% for the cross section of a square shape (W8), a weight reduction of about 50% for the cross section of a rectangular shape (W7), a weight reduction of about 45% for the cross section of a circular shape (W6), and a weight reduction of about 40% for the cross section of an elliptical shape (W5) could be achieved.

As described above, as a result of verifying the effect of the present invention by performing the above-described analysis, it was confirmed that a significant weight reduction could be achieved while securing a required buckling strength for the reaction links (W5 to W8) that were made of fiber reinforced plastic and were formed such that the outer cross-sectional area of the hollow cross section of the pair of linear portions is smaller than the outer cross-sectional area of the hollow cross section of the pair of bent portions and gradually decreases toward the other end. Furthermore, it was confirmed that the weight of the reaction link W5, which corresponds to the reaction link 12 of this embodiment, could be significantly reduced to 40% compared to the conventional reaction link W0 (that is, the weight could be reduced by as much as 60%). Therefore, it was confirmed that, according to the present invention, it is possible to provide an aircraft actuator that can achieve a significant weight reduction, while securing a sufficient buckling strength, even if it is provided with a reaction link in which larger bent portions are formed.

Although an embodiment of the present invention has been described thus far, the present invention is not limited to the above-described embodiment, and various modifications may be made within the scope recited in the claims. For example, the following modifications are possible.

(1) Although the above-described embodiment was described taking, as an example, a case in which the hollow cross section of the pair of bent portions of the reaction link is configured as a cross section whose outer perimeter and inner perimeter are formed in an elliptical shape, this need not be the case. For example, the hollow cross section of the pair of bent portions may be a cross section whose outer perimeter is formed in an elliptical shape and whose inner perimeter is formed in a circular shape. Alternatively, the hollow cross section of the pair of bent portions may be formed as a cross section of a circular shape, a cross section of a rectangular shape, or a cross section of a square shape, as described with regard to the analytic models with reference to FIGS. 12 to 14. Alternatively, it is possible to use various cross-sectional shapes other than those illustrated above, including, for example, a cross section of an elongated hole shape in which parallel sides are combined with circular arcs, a cross section of a triangular shape, a cross section of a polygonal shape having five or more sides, and a cross-sectional shape in which circular arc portions are combined at corners of the connection portions of straight sides.

(2) Although the above-described embodiment was described taking, as an example, a case in which the pair of linear portions are formed such that the cross-sectional area gradually decreases toward the other end, this need not be the case. For example, the pair of linear portions may be formed such that the cross-sectional area decreases compared to that of the pair of bent portions in a stepwise manner involving in one or more steps.

The present invention can be applied widely as an aircraft actuator including a hydraulically driven cylinder that is attached to a control surface or a horn arm member, and a reaction link that is provided pivotally with respect to the cylinder and the control surface. The present invention is not limited to the above-described embodiment, and all modifications, applications and equivalents thereof that fall within the claims, for which modifications and applications would become apparent by reading and understanding the present specification, are intended to be embraced therein.

What is claimed is:

1. An aircraft actuator comprising: a cylinder that is driven by hydraulic pressure, and is attached, at one end thereof, pivotally with respect to a control surface of an aircraft or a horn arm member attached to the control surface;
   a reaction link that comprises a pair of linear portions disposed alongside each other and each extending linearly, a coupling portion extending so as to couple one end of each of the pair of linear portions on the same side to each other, and a pair of bent portions formed as connection portions between the coupling portion and the pair of linear portions, the other end of each of the pair of linear portions being provided pivotally with respect to the other end of the cylinder, and a center portion of the coupling portion being provided pivotally with respect to the control surface,
   wherein the reaction link is made of fiber reinforced plastic, and is provided as a hollow member whose cross section at the pair of linear portions, the coupling portion, and the pair of bent portions is formed as a hollow cross section,
   an outer cross-sectional area of the hollow cross section at each of the pair of bent portions is larger than an outer cross-sectional area of the hollow cross section at each of the pair of linear portions, and
   fiber wound along a circumferential direction of a cross-sectional shape of the hollow cross section is provided at the pair of bent portions.

2. The aircraft actuator according to claim 1,
   wherein the hollow cross section at each of the pair of bent portions is a cross section whose outer perimeter and inner perimeter are formed in an elliptical shape.

3. The aircraft actuator according to claim 2,
   wherein the pair of bent portions are formed such that major axes of the elliptical shape of the hollow cross section at the pair of bent portions are disposed along the same plane.

4. The aircraft actuator according to claim 2,
   wherein the reaction link is made of carbon fiber reinforced plastic, and
   carbon fiber wound along a circumferential direction of the elliptical shape of the hollow cross section is provided at the pair of bent portions.

5. The aircraft actuator according to claim 1,
   wherein the pair of linear portions are formed such that an outer cross-sectional area of the hollow cross section at each of the pair of linear portions gradually decreases toward the other end.

* * * * *